Patented Sept. 12, 1950

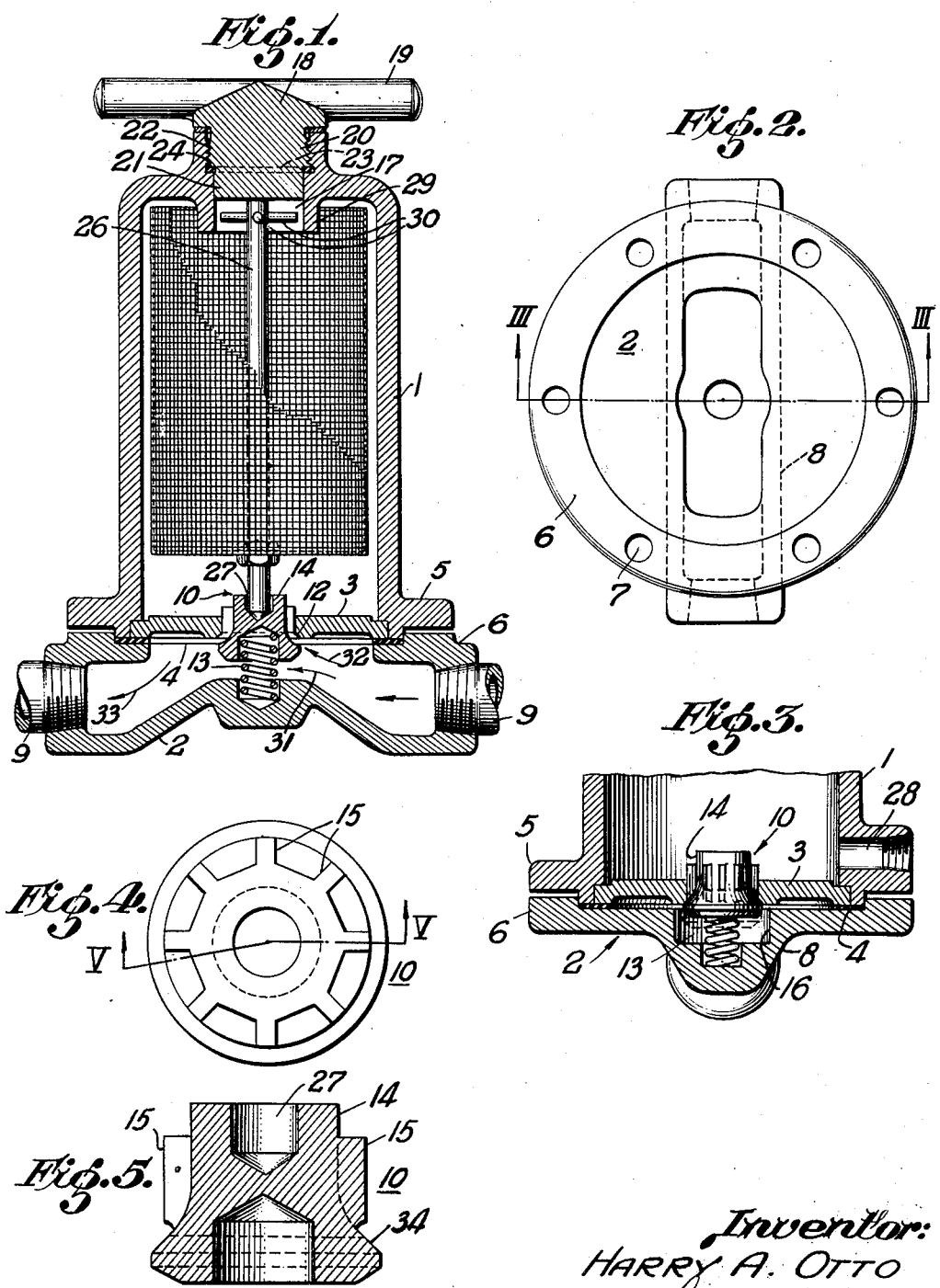

2,521,802

UNITED STATES PATENT OFFICE 2,521,802

FEEDING DEVICE

Harry A. Otto, Pittsburgh, Pa., assignor to Hagan Corporation, Pittsburgh, Pa., a corporation of Pennsylvania Application May 16, 1947, Serial No. 748,581

6 Claims. (Cl. 210—36)

This invention relates to feeding devices and more particularly to devices for feeding chemicals to water distribution systems in proportion to the flow of water in the system.

Water distribution systems such as found in industrial plants, buildings and homes, usually contain iron pipes, heating tanks, hot water coils, etc. Depending on the character of the water, such systems are subject either to corrosion or the deposition of calcium carbonate scale.

Soft waters are ordinarily nonscaling but are usually corrosive to iron pipes, while hard waters containing bicarbonate hardness scale up hot water heating coils and the hot water lines of the system.

In recent years, water distribution systems have been protected against both corrosion and deposition of carbonate scale by adding to the water a few parts per million parts of water flowing through the system of a water-soluble molecularly dehydrated phosphate. Water-soluble molecularly dehydrated phosphates are the alkali-metal phosphate glasses, alkali-metal tripolyphosphate, such as the sodium tripolyphosphate, the alkali-metal pyrophosphates, and the so-called "glassy polyphosphates" which exist as hypothetical compounds in numbers too numerous to mention.

The water-soluble molecularly dehydrated phosphates are usually employed where large quantities of water are to be treated. In practice these water-soluble molecularly dehydrated phosphates are dissolved in water to provide a predetermined concentrated solution, say a 15 to 30% solution, and this solution is fed by means of a proportioning device into the water to be treated in proportion to flow so as to maintain in the water a few parts per million of the phosphate, say from 1 to 20 parts per million. Usually the concentration which the feeder is to maintain is from 1 to 10 parts per million. The feeding of phosphate solution to the water in proportion to flow so as to maintain with a relatively high degree of accuracy the concentration desired requires accurate and quite intricate and expensive feeding equipment.

Where the quantities of water to be treated are relatively small, such as the quantities passing through the distribution systems in homes, apartments, small buildings and small industrial plants, it is not practical for many reasons to employ the water-soluble phosphates because the feeding equipment is too expensive and too complicated for the average person to operate and maintain.

For these systems, it is more feasible to employ a slowly soluble molecularly dehydrated phosphate such, for example, as calcium-sodium phosphate glass. Such a phosphate may be introduced into the water to be treated by relatively simple feeding devices. Where the water in a home or private dwelling is to be treated and the amount of water involved is quite small, the slowly soluble phosphate is placed in a closed container which is connected to the water supply pipe serving the dwelling. Water enters this feeder and causes the slowly soluble phosphate to dissolve at a slow rate. The dissolved phosphate passes into the water at such a rate and at such a dilution that an average concentration of phosphate in the system will be maintained at a few parts per million.

A feeder suitable for this purpose should be simple in construction and easily charged and re-charged with the slowly soluble phosphate. It should be free of parts or mechanism requiring adjustment and attention, and be relatively inexpensive.

An object of this invention is to provide a feeder for effecting dissolution of a slowly soluble phosphate and the proportional feeding of the solution formed into a water system at such a rate that a few parts per million of the phosphate is maintained in the water as it flows through the system.

Another object of the invention is to provide a feeder for the purpose above stated, that shall be simple in construction, comprise few parts, shall be easily installed and easy to charge and re-charge with phosphate material.

Another object of the invention is to provide a feeder that can be installed in a water line with minimum disruption to the line and which is provided with a filling plug and shut off valve so arranged that when the filling plug is removed to provide access to the chemical storage chamber thereof to recharge the container with phosphate, the valve automatically closes to shut off flow into the chemical storage container, but does not shut off flow of water through the system, and when the plug is put back in place, the valve is opened by the act of replacing the plug.

A still further object of the invention is to provide a feeder in which the valve not only acts to permit the flow of water into the chemical chamber or to shut off flow thereto, but also acts to proportion or regulate the rate of flow of water into and out of the chemical chamber, thereby to proportion or regulate the amount of chemical feed to the water taken by the distribution system.

Other objects of the invention will, in part, be apparent, and will, in part, be obvious from the following description taken in conjunction with the accompanying drawings in which:

Figure 1 is a view in vertical section of a feeding device arranged and constructed in accordance with an embodiment of the invention;

Fig. 2 is a top plan view of a fitting embodied in the feeder;

Fig. 3 is a partial view in section of the feeder taken on line III—III of Fig. 2;

Fig. 4 is an enlarged top plan view of the valve embodied in the feeder; and

Fig. 5 is a view in section of the valve taken on line V—V of Fig. 4.

Throughout the drawings and the specification, like reference characters indicate like parts.

The feeder embodying what now appears to be a preferred form of the invention comprises a chemical solution and storage container 1, a fitting 2 and a plate 3 disposed between the container 1 and fitting 2. A ring gasket 4 is disposed between the bottom of chamber 1, plate 3 and fitting 2 to provide a fluid tight joint when the fitting and the chamber are bolted together. The bottom of the container or chamber 1 is formed with a flange 5 and fitting 2 is provided with a matching flange 6 through which bolts not shown may extend to clamp these parts together, the bolt holes for these flanges being indicated at 7 in Fig. 2.

Fitting 2, as may be seen more clearly in Figs. 2 and 3, comprises the flange 6 and a conduit portion 8 that is somewhat rectangular in transverse section and extends along a line parallel to the diameter of valve plate 2. The opposite ends of this trough like portion are tapped to receive the water pipe 9 through which the water to be treated flows. The flow passage 8 of fitting 2 is constricted at about its middle portion, by the bottom wall of the trough 8 which slopes upwardly from each end towards a point immediately under the center portion of plate 3.

The plate or partition 3 is provided with an opening at its center for receiving a valve 10. Valve 10 is disposed in the constriction of the fitting 2. Plate 3 is formed with a valve seat 12 on which valve 10 seats when the valve is closed to prevent the flow of water into the chamber of container 1. Valve 10 is urged towards closed position by means of a compression spring 13.

Valve 10 is provided with a neck or spindle 14 having a plurality of veins or fins 15 spaced around the periphery thereof. These fins or veins serve to center the valve in the opening in plate 3 and also to cause water to be directed upwardly into container 1 when water flows through pipe 9.

As may be seen in Fig. 3, the space between the valve and the sidewalls 16 of the flow passage in fitting 2 is more restricted when valve 10 is in open position. This restriction functions to produce sufficient pressure differential to cause a portion of the water to flow into container 1 from the upstream side of the valve and out of it again to mingle with the stream of water on the downstream side.

Container 1 is provided with a charging opening 17 at its upper end and a screw plug 18 which may be screwed into or out of the opening by means of a handle 19. The screw plug has a relatively long shank 20 having a smooth surfaced extension 21 beyond the threads 22 of the plug. An annular groove 23 is formed on the inner surface of the chamber in the charging opening 17 to receive ring or gasket 24. This ring or gasket may be of the form known in the trade as an O ring, and is made of rubber of any suitable composition, either synthetic or natural. Gasket 24 acts with extension 21 to prevent leakage of water through opening 17 until valve 10 has closed when the plug is being removed.

The chemical to be dissolved in and fed from container 1 may be carried in a basket 25 made of suitable wire mesh, which is supported on valve 10. A convenient support for the basket may be a rod 26. Rod 26 as shown extends upwardly through the basket and is made long enough so that its upper end may be engaged by extension 21 of the screw plug 18. The lower end of the rod nests in a socket 27 in the valve. The length of the rod 26 is such that when the plug 18 is screwed into position to close the chamber, rod 26 is pushed downwardly to open the valve against the compression of spring 13.

When it is desired to charge the basket 25 with chemical, screw plug 18 is turned out of the charging opening 17 by means of a handle 19. As it is turned out of the charging opening, rod 26 is caused to follow the plug because of the compression of spring 13. The gasket or ring 24 acts to seal the plug while it is being turned out of its screw threads until the valve has traveled to its closed position and closed or shut off the flow of water from fitting 2 into container 1. Plug 18 may therefore be removed from the feeding device without danger of water squirting out of the charging opening. When the plug 18 has been removed, a quantity of the chemical, for example, a slowly soluble phosphate glass is placed in basket 25. Before adding all of the chemical to the basket, it may be desirable to drain some of the water from container 1. This may be done by opening a drain cock (not shown) connected to a tapped hole 28 in the bottom of chamber 1, see Fig. 3. When the desired amount of chemical has been added, a quantity of water may be poured into chamber 1 through the filling opening to displace excess air from the same, after which plug 18 is screwed into place. As it approaches its final position, the lower end of the plug engages the rod 26 and pushes the valve open.

In order to steady the basket in an upright position in the chamber and to maintain the upper end of rod 26 reasonably close to the center of the plug, container 1 may be formed with a tubular flange 29 that extends downwardly a predetermined distance below the top of the rod. Pins 30 may be inserted crosswise through the upper end of the rod so that the ends thereof engage flange 29 and maintain the basket and rod in a proper working position.

If it be assumed that the feeder has been connected in a pipe line 9 through which water flows and that the feeder has been charged with a quantity of chemical, and if it be assumed that the water flows through fitting 2 in the direction of arrow 31, it will be observed that the restriction under the valve 10 will cause water to flow upwardly in the direction of arrow 32 into the chamber of the feeder. The chemical which is dissolved in the water in the chamber will be carried out of it on the downstream side of the valve as indicated by arrow 33 and into the outlet of fitting 2. The flow indicated by arrow 32 is a comparatively small part of the total flow through trough 8 of the fitting.

The valve as shown in the drawings has a curved surface 34 extending from its seat to fins 15. This curved surface also aids in causing water to flow into container 1 and to displace therefrom water containing dissolved chemical. The fins 15 in addition to centering the valve in the valve opening of plate 3, also act to increase the velocity of flow into container 1 and to give direction to the flow of water into the container. In other words, these fins partition the opening in plate 3 in which the valve moves causing the water to flow up into container 1 on one side of the valve and downwardly through the valve opening on the other side of the valve.

Having thus described the invention, it will be apparent to those skilled in this art that various modifications and changes may be made in the feeder illustrated without departing from either the spirit or the scope of the invention. Therefore, what I claim as new and desire to secure by Letters Patent is:

1. A device for dissolving chemical and feeding the solution thereof in response to flow of water comprising a container having a screw plug closure for one end thereof, a plate extending across the other end of said container, a pipe fitting disposed over said plate and secured to the container, a valve in said plate, a spring urging said valve to closed position, said fitting having a channel portion of reduced flow area disposed adjacent said valve, the flow area of said channel being partially obstructed when said valve is open and a perforated basket in said container, said basket being supported at one end on said valve and having a projection at its other end disposed to be engaged by said screw plug to open the valve when said plug is screwed into closed position in said container, said valve being released to closed position as the plug is being removed from the container, said channel portion of reduced area and said valve, when the fitting is connected in a water line, being operative when the valve is open to develop a pressure differential across the valve in response to flow of water through the fitting causing water to flow into the container from the upstream side of the valve and to discharge dissolved chemical into the water flowing through said fitting on the downstream side of said valve.

2. A device according to claim 1 characterized by the fact that the screw plug is provided with an extension beyond the screw threads thereof that engages the projection on said basket and that the opening in the container into which the plug extends is provided with a sealing gasket that acts on the side of said plug extension to prevent leakage of water past the screw plug while it is being removed from the container to close said valve.

3. A device according to claim 1 characterized by the fact that the valve is provided with a plurality of vanes disposed around the same in a plane above the seating surface thereof for accentuating flow of water into and out of said container when there is flow through said fitting.

4. A device for dissolving chemical and feeding the solution thereof in response to flow of water, comprising a container having a screw plug closure for one end thereof, a valve in the opposite end of said container, a pipe fitting on the valve end of said container enclosing said valve, said fitting having a flow passage of reduced flow area disposed below said valve, the flow area of said passage being partially obstructed by said valve when said valve is open, a spring normally urging said valve towards closed position, a rod supported at one end on said valve and having its opposite end disposed to be engaged by said plug and open said valve when said closure plug is in closed position, said spring causing said valve and rod to follow said plug as it is turned out of the container until said valve closes, and a perforated screen in said container for supporting chemical thereon above said valve, the reduced flow area of said passage and said valve, when the fitting is connected in a water line, being operative when the valve is open to develop a pressure differential across the valve causing water to flow into the container from the upstream side of said valve and to discharge dissolved chemical from the container into the water flowing through the fitting on the downstream side of said valve.

5. A device according to claim 4 characterized by the fact that the screw plug is provided with an extension beyond the screw threads thereof that engages said rod and that the opening in the container into which the plug extends is provided with a sealing gasket that acts on the side of the plug extension to prevent leakage of water past the screw plug while it is being removed from the container to close said valve.

6. A device according to claim 4 characterized by the fact that the valve is provided with a plurality of vanes disposed around the same in a plane above the seating surface thereof for accentuating flow of water into and out of said container when there is flow through said fitting.

HARRY A. OTTO.

REFERENCES CITED

The following references are of record in the file of this patent:

UNITED STATES PATENTS

| Number | Name | Date |
| --- | --- | --- |
| 412,910 | Blessing | Oct. 15, 1889 |
| 423,773 | Jewel | Mar. 18, 1890 |
| 440,162 | Jewel | Nov. 11, 1890 |
| 1,409,248 | Sevcik | Mar. 14, 1922 |

FOREIGN PATENTS

| Number | Country | Date |
| --- | --- | --- |
| 300,341 | Great Britain | Nov. 15, 1928 |